Figure 1:
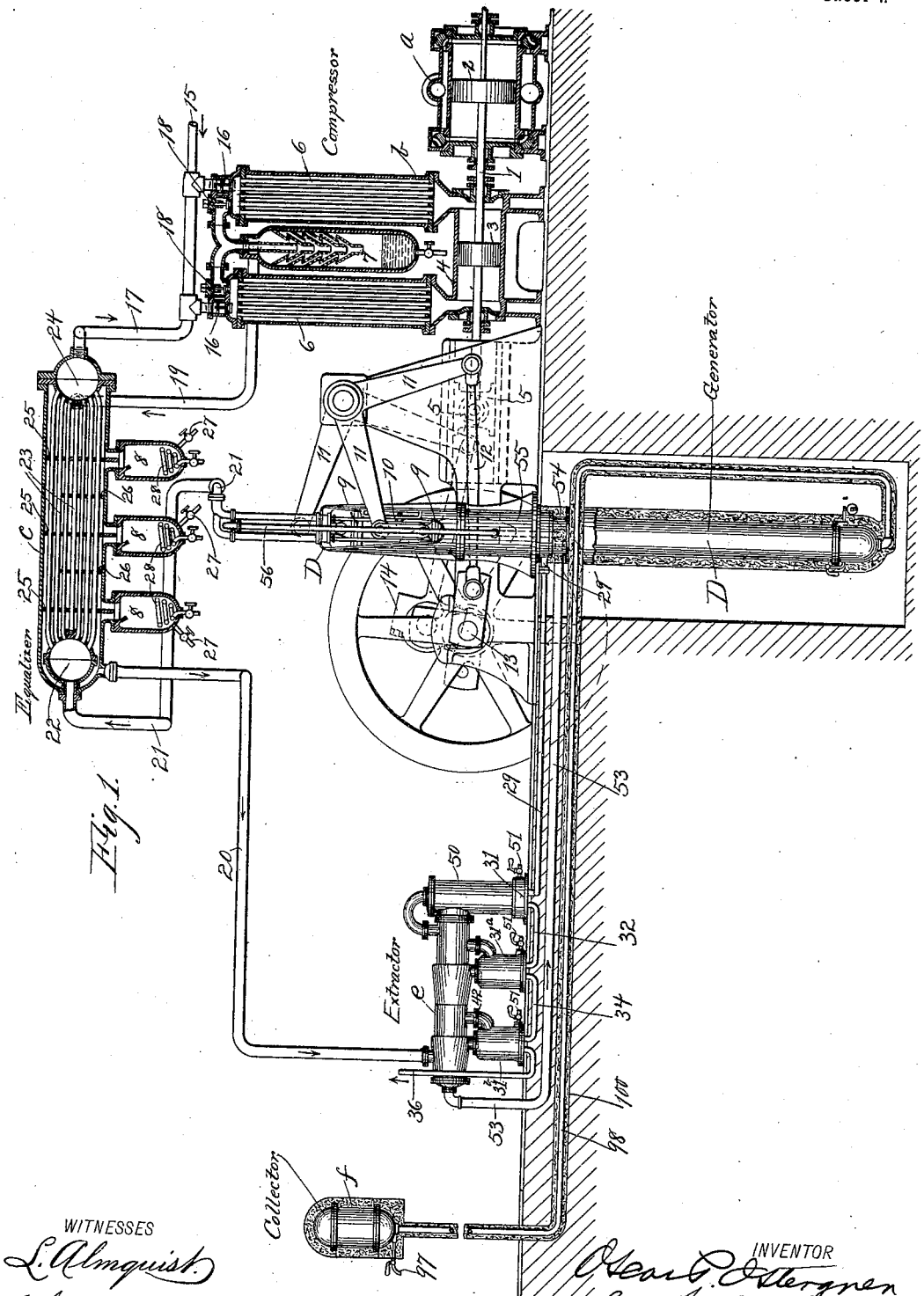

No. 686,530. Patented Nov. 12, 1901.
O. P. OSTERGREN.
APPARATUS FOR THE LIQUEFACTION OF ATMOSPHERIC AIR.
(Application filed June 19, 1900. Renewed Apr. 17, 1901.)
(No Model.) 5 Sheets—Sheet 1.

WITNESSES
L. Almquist
C. Sedgwick

INVENTOR
Oscar P. Ostergren
by A. P. Thayer.
ATTY

No. 686,530. Patented Nov. 12, 1901.
O. P. OSTERGREN.
APPARATUS FOR THE LIQUEFACTION OF ATMOSPHERIC AIR.
(Application filed June 19, 1900. Renewed Apr. 17, 1901.)

(No Model.) 5 Sheets—Sheet 2.

WITNESSES
L. Almquist
C. Sedgwick

INVENTOR
O. P. Ostergren
By F. P. Thayer
ATTY

No. 686,530. Patented Nov. 12, 1901.
O. P. OSTERGREN.
APPARATUS FOR THE LIQUEFACTION OF ATMOSPHERIC AIR.
(Application filed June 19, 1900. Renewed Apr. 17, 1901.)
(No Model.) 5 Sheets—Sheet 3.
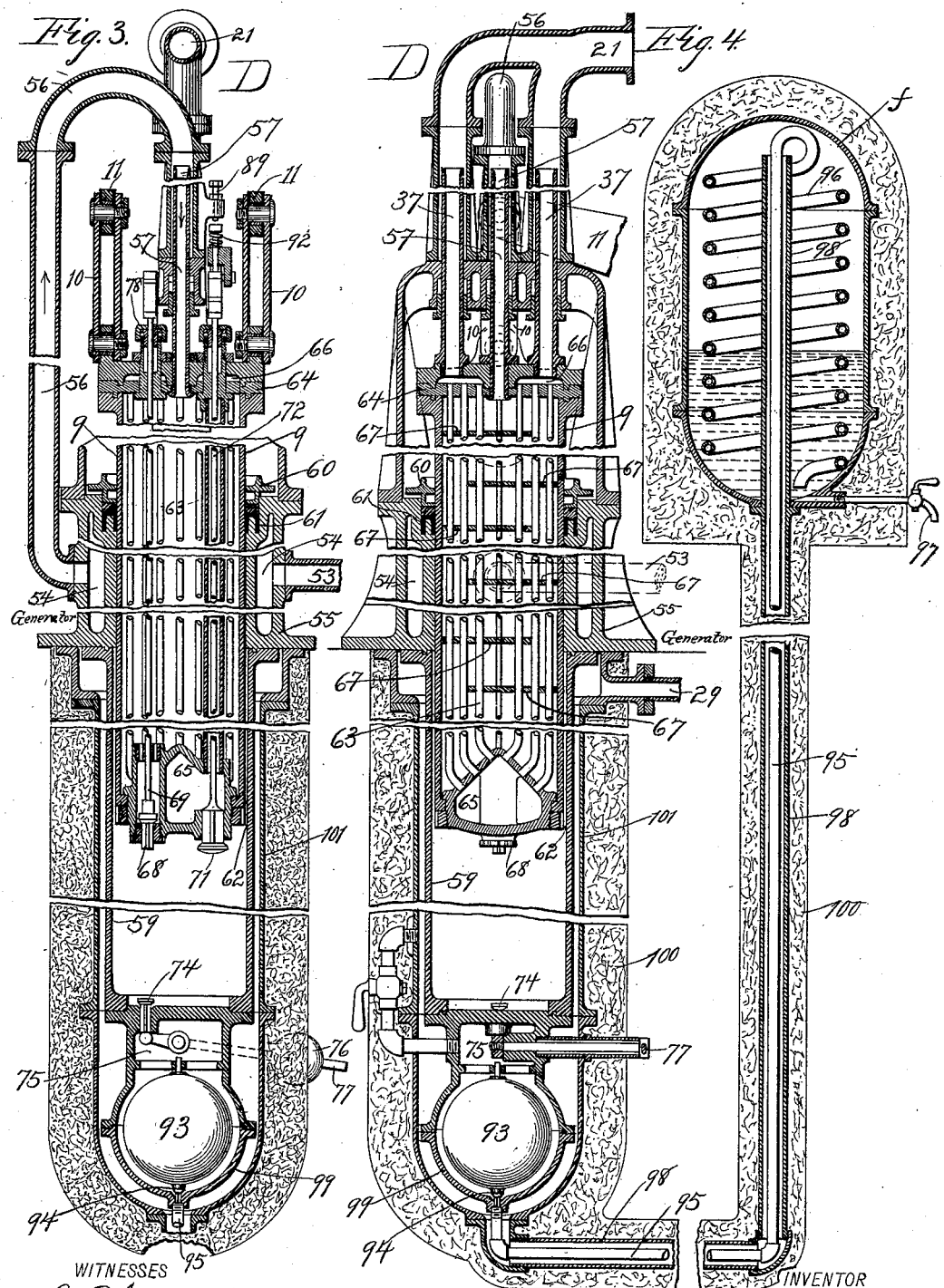
WITNESSES
L. Almquist
C. Sedgwick
INVENTOR
Oscar P. Ostergren
by A. P. Thayer
ATTY No. 686,530. Patented Nov. 12, 1901.
O. P. OSTERGREN.
APPARATUS FOR THE LIQUEFACTION OF ATMOSPHERIC AIR.
(Application filed June 19, 1900. Renewed Apr. 17, 1901.)

(No Model.) 5 Sheets—Sheet 4.

WITNESSES
L. Almquist
C. Sedgwick

INVENTOR
Oscar P. Ostergren
by N. P. Thayer
ATTY

THE NORRIS PETERS CO., PHOTO-LITHO., WASHINGTON, D. C.

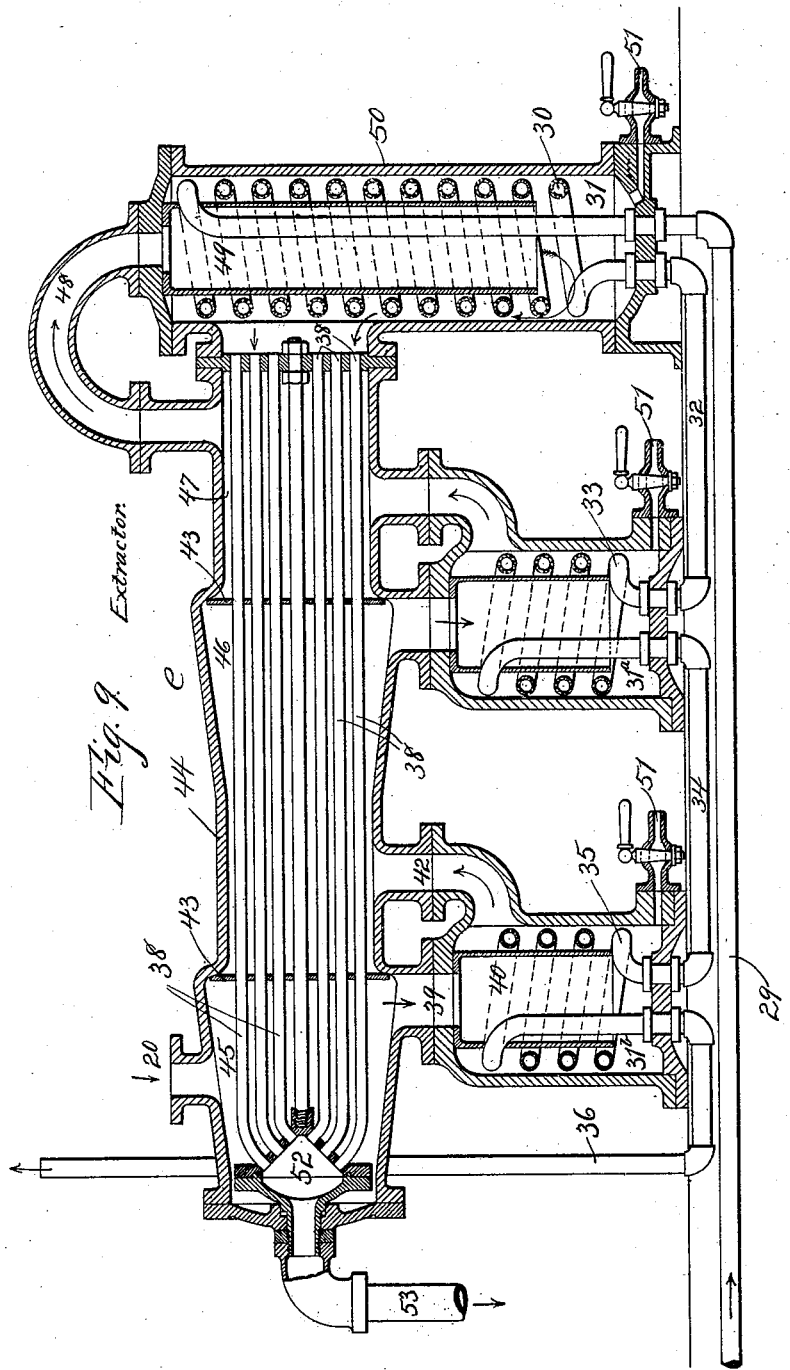

UNITED STATES PATENT OFFICE.

OSCAR P. OSTERGREN, OF BEDFORD PARK, NEW YORK, ASSIGNOR TO THE OSTERGREN MANUFACTURING COMPANY, A CORPORATION OF NEW JERSEY.

APPARATUS FOR THE LIQUEFACTION OF ATMOSPHERIC AIR.

SPECIFICATION forming part of Letters Patent No. 686,530, dated November 12, 1901.

Application filed June 19, 1900. Renewed April 17, 1901. Serial No. 56,219. (No model.)

*To all whom it may concern:*

Be it known that I, OSCAR P. OSTERGREN, a subject of the King of Sweden and Norway, and a resident of Bedford Park, borough of Bronx, city and State of New York, have invented certain new and useful Improvements in Apparatus for the Liquefaction of Atmospheric Air, of which the following is a specification.

The object in view with this invention is to make possible a machine or apparatus by which atmospheric air can be liquefied with a moderate expenditure of power and with moderate air-pressures.

All former air-liquefying devices that have stood practical tests have, as far as I know, in common a very limited efficiency, due to the fact that the air is allowed to expand from a very high pressure through a nozzle or a valve without performing any available work, and since the air particles are thus allowed to strike the walls of an expansion-chamber heat is as a consequence regained in a very great measure, or, in other words, the refrigerating effect is low. Said effect is the now well-known "Joule" effect, viz:

$$T_1 - T_2 = \frac{P_1 - P_2}{4} \left(\frac{289}{T_1}\right)^2.$$

General equations existing between the pressure volume and temperature of compressed air expanded in a non-conducting cylinder combining the laws of Mariotte, Gay-Lussac, and the second law of thermodynamics are I. $\dfrac{P_2}{P_1} = \left(\dfrac{V_1}{V_2}\right)^n.$ II. $\dfrac{T_2}{T_1} = \left(\dfrac{V_1}{V_2}\right)^{n-1}.$ III. $\dfrac{T_2}{T_1} = \left(\dfrac{P_2}{P_1}\right)^{\frac{n-1}{n}}.$ Work available from adiabatic expansion is given IV. $W = \dfrac{P_1 V_1}{n-1}\left[1 - \left(\dfrac{P_2}{P_1}\right)^{\frac{n-1}{n}}\right] = R\dfrac{(T_1 - T_2)}{n-1},$ where $T_1$ and $T_2$ equal absolute temperature before and after expansion. $P_1$ and $P_2$ equal absolute pressure before and after expansion. $V_1$ and $V_2$ equal absolute volumes before and after expansion. $n$ equals $Cp:Cv$, equals 1.4. Cp equals 0.2375, equals specific heat of air at constant pressure. Cv equals 0.1700, equals specific heat of air at constant volume. R equals 96.0376.

In the present invention, which I now will proceed to describe, air is first compressed either in the usual manner with dry compressors or preferably, as herein shown, isothermally by hydraulic compression to a pressure preferably not to exceed three hundred pounds to the square inch. The expansion of the air will take place in a power cylinder or cylinders under development of exterior work to be used in compressing new air, and the refrigerating efficiency due to a certain drop of pressure will therefore be in accordance with formulas II and III, and all the expenditure of power on the isothermal compression of the air will result in a full equivalent of refrigeration through the adiabatic expansion of the same. Formula I shows the relation of pressure and volume, while formula IV shows the amount of work available from adiabatic expansion in foot pounds.

To fairly illustrate the great difference of refrigerating efficiency in expanding air simply through a nozzle, as above referred to, or adiabatically, as in the pressure device, we will suppose that air at twenty atmospheres (three hundred pounds to square inch) is allowed to expand to a pressure of four atmospheres absolute pressure, and let us suppose in both cases that the initial temperature equals 0° or 459° absolute temperature in Fahrenheit degrees. Then according to Joule drop of temperature in centigrade degrees equals $$255 - T_2 = \frac{20-4}{4}\left(\frac{289}{255}\right)^2 =$$

5.05 centigrade or 9.09 Fahrenheit, only a little more than one and one-half of a degree, with all the work due to expansion wasted.

In the second case we have, according to formula III, $$\frac{T_2}{459} = \left(\frac{4}{20}\right).2857 = .1512$$

and $$T_2 = .1512 \times 459 = 69.4° \text{ absolute},$$

or drop of temperature in degrees equals $$459 - 69.4 = 389.6.$$

This low temperature would not, of course, be reached, because part of the air would liquefy at the critical point. Outside of this great drop of temperature we regain work from the expansion of the air, (see formula IV,) which will be employed in compressing more air.

The means employed for making this machine operative I will now fully describe, and the novel features which I regard as essential for its successful operation will, furthermore, be pointed out in the claims.

Figure 2:
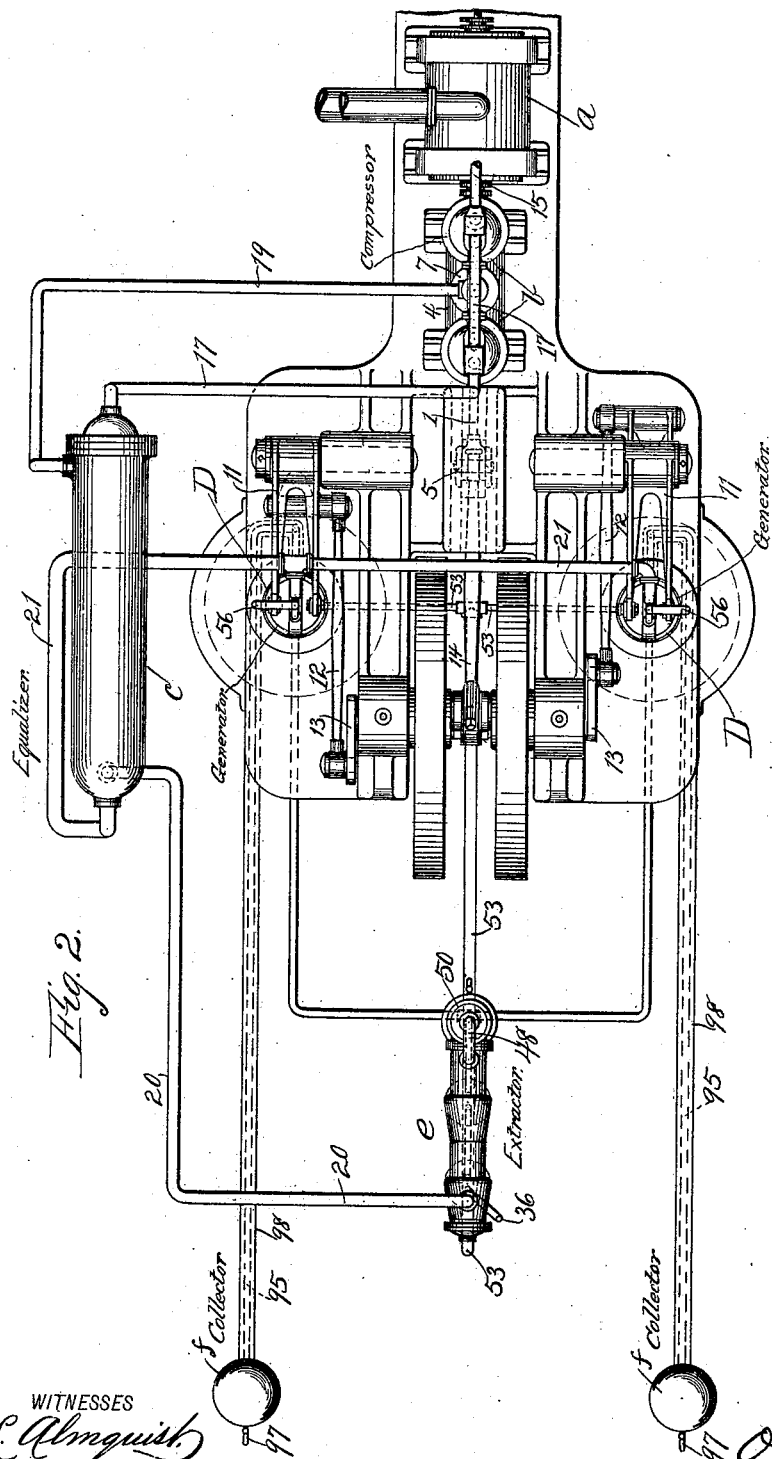
Figure 5:
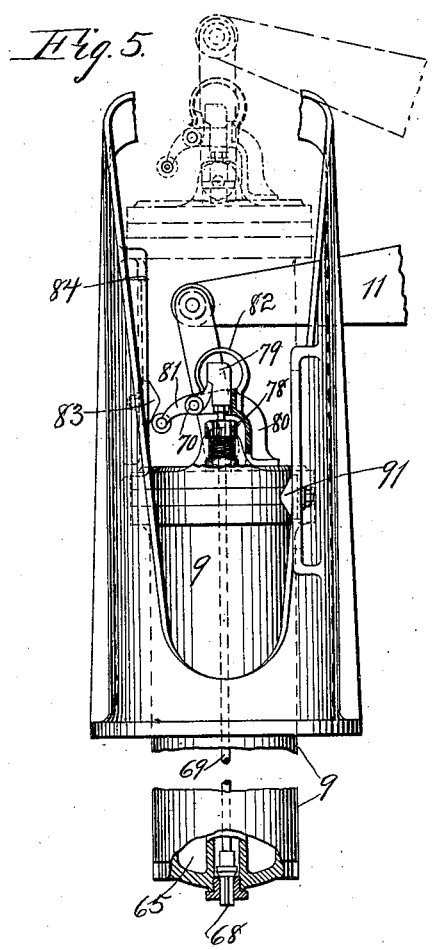
Figure 6:
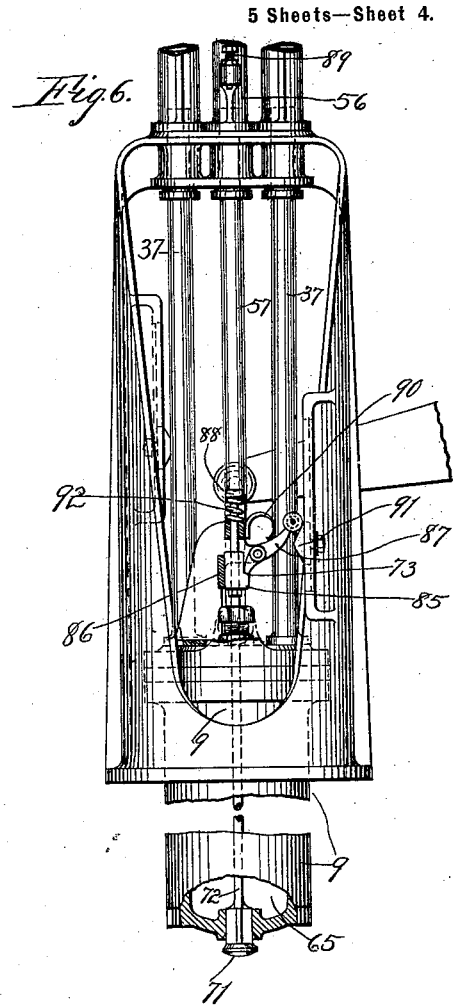
Figure 7:
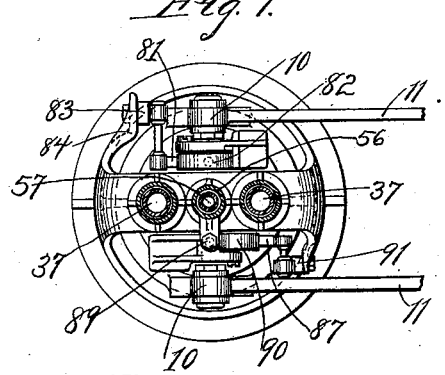
Figure 8:
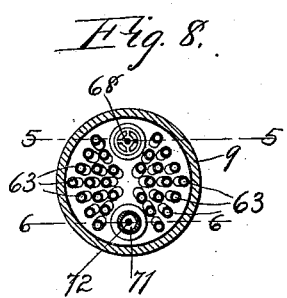

In the accompanying drawings, Figure 1 represents a vertical section of the entire apparatus of my invention. Fig. 2 is a horizontal or plan view of the same. Fig. 3 is a central sectional elevation through a part of the apparatus, which I will designate as "generator." (See Fig. 1.) Fig. 4 is also a vertical elevation of the same; but the section is taken at a right angle with the former. Figs. 5 and 6 are exterior views of the upper portion of the generator and parts of the lower extremity of the power-piston, partly in section, showing in detail the governing mechanism for admission and emission of air before and after expansion. Fig. 7 is a top view of the same with some parts in horizontal section. Fig. 8 is a horizontal section or cross-section of a combined counter-current apparatus and power-piston, and Fig. 9 is an enlarged vertical sectional view of a moisture and carbonic-acid extractor.

In Fig. 1, $a$ is a steam or power cylinder, and 2 a piston. $b$ is a hydraulic air-compressor, in which 4 is the cylinder and 3 the piston. 1 is a piston-rod connected with pistons 2 and 3 and extending to cross-head 5. 6 6 are multitubular hydraulic piston-containers in which the air is compressed and cooled. 7 is a moisture-trap for separating water from the compressed air. $c$ is a counter-current apparatus, which serves the double purpose of equalizing the temperature of the compressed air which surrounds the tubes with the temperature of the expanded air which fills the tubes and for removal of moisture from the compressed air as it passes through a series of traps 8. D indicates a couple of generators in which the compressed air expands under generation of low temperature and mechanical power. The power is transmitted through pistons 9, links 10, bell-cranks 11, connecting-rods 12, crank-shaft 13, and connecting-rod 14 to piston-rod 1 and piston 3 of the air-compressor. $e$ is an extractor for any additional moisture and carbonic acid, and $f$ is a collector for liquid air.

Air is first introduced through pipe 15 and suction-valves 16 into compressor $b$, either directly from the atmosphere or from a special feed-pump or compressor. (Not shown on the plan.) At the same time another current of air returning from equalizer $c$ and pipes 17 mingles with the aforesaid air and enters compressor $b$. All the air is then compressed to a suitable pressure—say two hundred and fifty to three hundred pounds to the square inch. Then it passes through discharge-valves 18 into the first moisture-separator 7, then through pipe 19 into equalizer $c$ and through traps 8 successively and then through pipe 20 into extractor $e$. The moisture-separator 7 is of well-known construction and need not be described in detail. Equalizer $c$ is an apparatus in which an exchange of temperatures takes place between the compressed air and the expanded air returning from generators D. The difference of temperatures between the two currents to be exchanged in this apparatus is to be limited to about 40° Fahrenheit. The returning air from the generators enters a chamber 22 from pipe 21. It then goes through a multitude of tubes 23 into chamber 24 and pipe 17 to the compressor. The compressed-air current enters apparatus $c$ from pipe 19 and intermingles among tubes 23 and is deflected by baffle 25 into the first trap 8. From said trap 8 it is led up among the tubes again and over top of baffle 26 into the second trap 8, and so on until all the traps have been passed by the air. It will be noticed that the air is thus made to flow up and down across tubes 23, which facilitates the absorption of heat from the air by said tubes. It is a well-known fact that air can only hold a certain amount of moisture combined with itself, according to its temperature and pressure, and it is found that the largest portion of moisture in air can be trapped off with suitable means before the freezing-point is reached if it is gradually cooled down. We will therefore get more or less moisture in all the traps 8, which must be drawn off from time to time through cocks 27. The traps are provided with heating-coils 28, through which steam or other heating fluid may be used in case that ice should be formed. The air thus precooled to a certain extent and freed from the greater part of moisture is led into extractor $e$ through pipe 20. (See Fig. 9.) The mission of said extractor is to relieve the air from any remaining moisture and from carbonic acid. It must here be stated that it is of the greatest importance for the successful and continuous running of a liquid-air plant to have the moisture and carbonic acid of the atmosphere removed as completely as possible, since said fluids have a tendency to aggregate in contracted passages where the temperature is low in a solid state, and thereby stop any further circulation of air. I have for that reason introduced this additional apparatus wherein the air can be brought down to a sufficiently low temperature for the extraction of carbonic acid with the expenditure of a very small amount of refrigerating power. Air-vapors from the liquid-air collector $f$, Fig. 4, having first been employed for insulating some parts of the generator in a manner to be described later on are conducted through a pipe 29 into a coil 30 in trap 31 of said extractor e. Said vapors enter said coil at a temperature of about 80° Fahrenheit below zero. From coil 30 the cold air is conducted through pipe 32 into coil 33 in trap 31$^a$ from coil 33 and through pipe 34 to coil 35 in trap 31$^b$, and from coil 35 through pipe 36 to the atmosphere, if so desired. The previously compressed and cooled air entering extractor e through pipe 20 crosses a multitude of tubes 38 and enters through opening 39 into drop-cylinder 40 in trap 31$^b$. It then turns around the lower end of cylinder 40, which is open at the lower end, and ascends in trap 31$^b$, giving up some heat to coil 35 and depositing moisture in the form of snow in the lower part of said trap. The air then ascends through passage 42 and up among tubes 38 again, between plates 43, which divide vessel 44 into three different compartments 45, 46, and 47. From compartment 46 the air traverses the next trap 31$^a$ in a similar manner, and some carbonic acid in a liquid state will now be deposited, as more heat is absorbed by coil 33. From compartment 47 the air is conducted through passage 48 into cylinder 49, around the lower end of same, and up in vessel 50, while more heat is given up to coil 30. In this vessel carbonic acid will be deposited as snow. The traps can be blown out by means of cocks 51 when desired. After having passed all these traps the air is made to return into chamber 52 at the end of entrance into extractor e through tubes 38. In passing through said tubes toward chamber 52 the air will now absorb heat from the new incoming air in compartments 47, 46, and 45. The cooling action on the said incoming new air is thus chiefly brought about by outgoing air, and it will now be seen that only a small amount of cold air is needed to pass the coils for starting and maintaining the low temperature required in vessel 50. It is also evident that the temperature of the coils will be somewhat lower than the temperature of the air surrounding the same. This condition will promote the deposit of moisture and carbonic acid in the traps. From chamber 52 the air is conducted through pipe 53 to generator D, (one or more,) where it enters a jacket 54, surrounding a cylinder-head 55, in which a plunger-piston 9 works (see Figs. 3 and 4) for the purpose of keeping said head at a reasonably high temperature. From jacket 54 the air enters through pipe 56 and the hollow tail-rod 57 into the combined equalizer and plunger-piston 9. Said piston 9 is a cylindrical shell which works in a surrounding cylinder 59. The cylinder-head 55 is mounted on the upper end of cylinder 59 and has at its upper end a stuffing-box 60 and an air-tight packing 61. Said head 55 and piston 9 are finished to fit one another for the proper guidance of said piston, which has an upward-and-downward motion. A clearance-space 62 is provided between cylinder 59 and piston 9, as the lower parts of both cylinder and piston are subjected to very low temperatures—viz., that of liquid air. A multitude of tubes 63 are inserted within the hollow piston, which is made unusually long, between a tube-plate 64 of its upper end and a chamber 65 in its lower end. A space 66 above said tube-plate 64 communicates with chamber 65 by said tubes 63. The air on entering through hollow tail-rod 57 will intermingle among tubes 63; but its path will take a zigzag course on account of baffles 67, which will cause the air to come in contact with all parts of the tubes and prevent direct passage between the same as it descends toward valve 68. Said valve 68 admits the air into cylinder 59 under piston 9 during a desired period of the upstroke of said piston 9 in the same manner as in a compressed-air motor or steam-engine, said valve being opened automatically by contact of its lower end with valve 74 a little before the piston reaches the extremity of its downstroke. After the admission period the air is allowed to expand until the completion of the upstroke, when emission-valve 71 opens. Valve 71 remains open during the greatest part of the downward stroke of piston 9. The air being greatly reduced in temperature, due to adiabatic expansion, will enter chamber 65 and ascend through the multitude of tubes 63 into space 66 at the top of piston 9 and through hollow tail-rods 37 (see Fig. 4) and pipe 21 to equalizer c. After a few strokes have been made the temperature will be so reduced, due to the degenerative action of the adiabatic expansion and the temperature-equalizing effect of the descending and ascending air-currents in the piston, that part of the air will liquefy. Such liquefied air will of course accumulate at the bottom of cylinder 59 and will through gravity descend through valve 74 into space 75 below. Valve 74 is not allowed to be open during the admission and expansion periods, as it is not desired to have any higher pressure in space 75 than the exhaust-pressure in the cylinder above. For that reason valve 74 is brought down on its seat through contact with valve 68, which is placed centrally over the same as piston 9 arrives at the lower end of its stroke. After valve 74 is seated a little before the completion of said stroke valve 68 is lifted from its seat as quick as valve 74 becomes immovable. The high-pressure air above valve 68 will now rush into cylinder 59, fill all clearance-spaces, and create a sufficient pressure to keep valve 74, which is counterbalanced by weight 76 and lever 77, down. Valve 68 thus lifted from its seat will, through its motion relative to piston 9, cause its rod 69 to be lifted. Said rod, which passes through a stuffing-box 78, has a notched headpiece 79, backed with a bracket 80. The notch of said headpiece 79 when lifted registers with a trigger or catcher 81, which falls into place through the action of spring 82. Valve 68 is thus held up by means of said trigger during any desired periods of the stroke. A tappet 83, fastened on a bracket 84, is so located that trigger 81 when passing is tripped, headpiece 79 unlatched, and valve 68 falls and closes. The position of tappet 83 can be changed at will, being adjustably attached to a bracket 84 to be adjusted to suit the exact point of cut-off desired. Valve 71 is also automatically operated. 85 is a head on its rod 72, guided by bracket 86. 87 is a trigger or latch fulcrumed on bracket 86. An extension 88 on headpiece 85 strikes a stop 89 as the piston approaches the upper limit of its stroke. Valve-rod 72 and valve 71 are consequently pushed down in relation to the piston, and trigger 87, which registers with a notch in headpiece 85 and is actuated by a spring 90, will fall in said notch and keep said valve and rod down until unlatched by a tappet 91 at the lower end of the stroke. A coiled spring 92 tends to lift the valve-rod at all times, and as soon as said rod is unlatched the spring will close the valve. When a certain amount of liquid air has accumulated in space 75 around float 93, said float will cause valve 94 to open. The liquid will then enter pipe 95 and ascend into coil 96 and down through the same into collector $f$, from which it can be drawn off through cock 97 at will.

As the pressure in collector $f$ is to be the same as the atmosphere, the vapors arising from the liquid are let off through a pipe 98. The said vapors will be employed for protection of pipe 95, vessel 99, and cylinder 59 from atmospheric heat. Additional protection is provided for by means of suitable lagging 100. The vapors in flowing in an opposite direction to that of the liquid in pipe 98, which surrounds pipe 95, and then around vessel 99 and the cold part of generator D, which are inclosed in a jacket 101, will thus to some extent help the refrigerating action of the power and liquefying engine. After leaving jacket 101 the said vapors, which are yet of a considerably low temperature, will be conveyed through pipe 29 into the coils of extractor $e$, as previously described, from which they escape into the atmosphere through pipe 36.

The counter-current plunger-piston, combined with the cylinder, having clearance-space below the cylinder-head, is especially favorable for working under excessively low temperature, because the incoming warm air tempers the plunger and cylinder-head so as to prevent freezing, and there are no contact-points of the plunger and cylinder in the lower and colder part of the cylinder liable to obstruction by freezing.

What I claim as my invention is—

1. The combination of means for compressing air and separating the moisture deposited by compressing and cooling it, consisting of the air compressor and cooler and its moisture-trap, counter-current equalizer and its series of traps, and the expanding, cooling and power-generating engine and liquid-air separator having the counter-current plunger-piston, said compressor and cooler, equalizer and engine suitably connected for circulation of the compressed air through them respectively and for return of the waste expanded air from the engine through the equalizer.

2. The combination of means for compressing air and separating the moisture deposited by compressing and cooling it, consisting of the compressor and cooler and its moisture-trap, the counter-current equalizer and its series of traps, the upright expanding, cooling and power-generating engine and liquid-air separator having the counter-current plunger-piston and the trap for discharging the liquid air from said engine, said compressor and cooler, equalizer and engine suitably connected for circulation of the compressed and dried air through them respectively and for return of the waste expanded air from the engine through the equalizer.

3. The combination of means for compressing air and separating the moisture deposited by compressing and cooling it, consisting of the air compressor and cooler and its moisture-trap, the counter-current equalizer and its series of traps, and the upright expanding, cooling and power-generating engine and liquid-air separator having the counter-current plunger-piston, the trap for discharging the liquid air from said engine, collecting-chamber for the liquid air, and means for utilizing the vapors rising in said collecting-chamber for reducing the temperature of the power and liquefying engine, said compressor and cooler, equalizer and engine suitably connected for circulation of the compressed and dried air through them respectively and for the return of the waste expanded air from the engine through the equalizer.

4. The combination of means for compressing air and separating the moisture deposited by compressing and cooling it, consisting of the compressor and cooler and its moisture-trap, the counter-current equalizer and its series of traps, the extractor and its traps, and the counter-current expanding, cooling and power engine and liquid-air separator having the counter-current plunger-piston, said compressor and cooler, equalizer and extractor suitably connected for circulation of the compressed air through them respectively and for return of the waste expanded air from the engine through the extractor and equalizer to the compressor and cooler.

5. The combination of means for compressing air and separating the moisture deposited by compressing and cooling it, consisting of the compressor and cooler and its moisture-trap, the counter-current equalizer and its series of traps, the extractor and its traps, the counter-current expanding, cooling and power engine and liquid-air separator having the counter-current plunger-piston, said extractor consisting of the horizontal multitubular counter-current device laterally divided into compartments with a trap at each division through which the air to be cooled is directed in passing from one compartment to another, said traps having a coil traversed by the waste expanded cold air.

6. The combination of means for compressing air and separating the moisture condensed in it by compression, an expanding, cooling and power-generating engine operated by the compressed air, means for utilizing the expanded air exhausted from the power-engine for cooling the compressed air and further separating moisture from it preparatory to use in the power-engine, and means for separating the liquid air deposited in the expanding, cooling and power engine, said engine comprising a cylinder, hollow multitubular plunger-piston having counter-current systems of subdivided passages for the compressed air and spent air respectively, with intermediate conductive material, and means for introducing the air to the cylinder and exhausting it therefrom through said passages respectively.

7. In apparatus for liquefying compressed air, an expanding, cooling and power-generating engine operated by the compressed air, and consisting of the upright cylinder and the counter-current plunger-piston, said cylinder having clearance-space surrounding the piston below its head, and the piston having inlet and outlet connections for the warm air and cold air respectively, and controlling-valves therefor, and the cylinder having an outlet for the liquid air below the piston.

Signed at New York city this 13th day of June, 1900.

OSCAR P. OSTERGREN.

Witnesses:
C. SEDGWICK,
J. M. HOWARD.